C. G. SMITH.
SPRING WHEEL.
APPLICATION FILED AUG. 19, 1920.
1,436,730.  Patented Nov. 28, 1922.
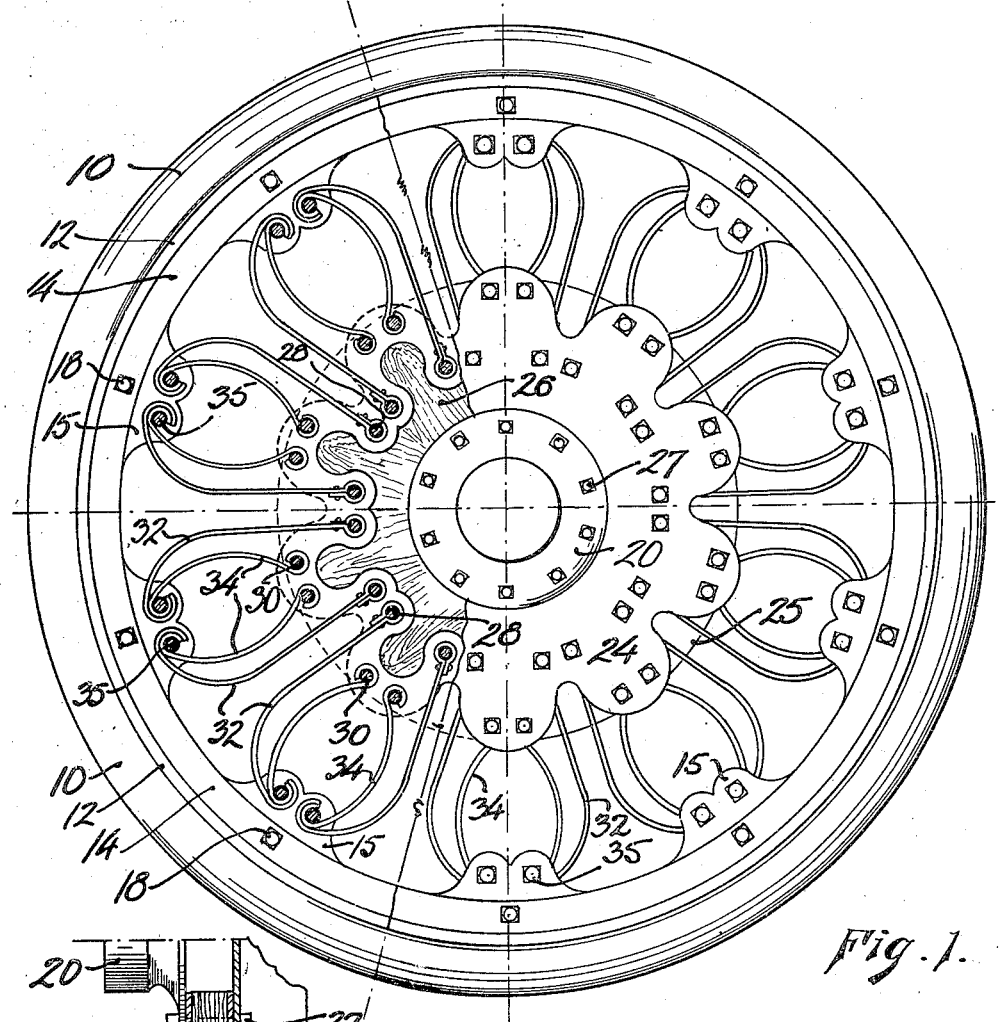
Fig. 1.
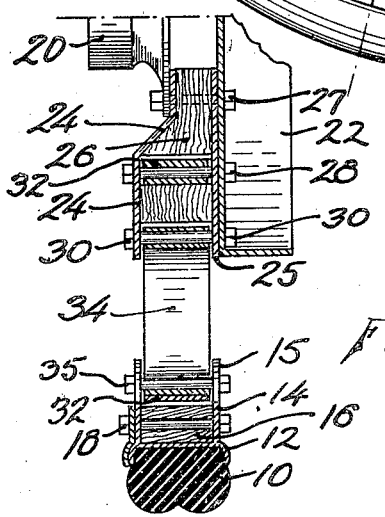
Fig. 2.
Inventor
C. G. Smith.
By 
Attorney Patented Nov. 28, 1922.

1,436,730

UNITED STATES PATENT OFFICE.

CICERO G. SMITH, OF DETROIT, MICHIGAN.

SPRING WHEEL.

Application filed August 19, 1920. Serial No. 404,608.

*To all whom it may concern:*

Be it known that I, CICERO G. SMITH, a citizen of the United States, residing at Detroit, county of Wayne, and State of Michigan, have invented certain new and useful Improvements in Spring Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a spring wheel which will be durable and efficient. More particularly the object is to provide such a wheel having spring spokes composed of pairs of springs having different lengths, wherein the springs do not interfere with each other during operation thereby avoiding breaking of springs by interference. At the same time they are to be free to perform their intended functions and to cooperate with one another.

Briefly the invention comprises hub and rim members connected by spring spokes, each spoke comprising a pair of oppositely curved short springs and a pair of oppositely curved long springs, the various springs having their working portions spaced from one another, whereby interference during operation is eliminated.

In the drawings:

Fig. 1 is an elevation of a wheel embodying the invention, with a portion of the outer plate broken away; and Fig. 2 is a section from hub to circumference taken on any of the section lines indicated.

The drawings show a tire 10 on a rim 12 having sides 14 provided with ears 15, a felly 16 being positioned between said sides and seceured by bolts 18. A metal hub 20 and brake drum 22 are connected with a back plate 25, a front plate 24 and a wooden hub member 26 by inner bolts 27, intermediate bolts 28 and outer bolts 30. To the intermediate bolts 28 long springs 32 are pivoted at their inner ends, the inner ends of short springs 34 being pivoted to outer bolts 30.

The short springs 34 are arranged in pairs, those of each pair being oppositely curved and disposed as shown. The long springs 32 are arranged similarly but without the short pairs 34, their inner portions being preferably straight as shown. The outer end of each short spring 34 is pivoted upon a bolt 35 passing thru the ears 15 and the outer end of the adjacent long spring 32 is passed around the eye of the respective short spring whereby said outer ends have the same pivot. But it will be noted that this is the only point of contact between the springs and that the operating or body portions are out of contact.

In operation, the springs at the lower side of the wheel will curve while those at the upper side will tend to straighten. If the load is excessive the lower springs will bend until the upper short springs 34 are straightened out so as to tend to suspend the weight from the corresponding pivots 35 on the said short springs.

In this way each of the springs operates entirely free from engagement with any other spring, and broken springs caused by interference are avoided. At the same time the cooperation of the long springs with the short ones to retain their operative relations, is not interfered with.

Each of the pivoting bolts 27, 28 and 30, preferably has a bushing thereabout within the eyes of the springs as indicated by the black circles.

I claim:

1. A spring wheel having a hub member and a rim member, curved springs pivotally connected to said hub and rim members, said springs comprising a plurality of similar groups, each group consisting of two pairs of springs of unequal length, one spring of each pair being attached to a common pivot on the rim but to separate pivots on the hub member, the shorter pair of springs being located between the members comprising the longer pair and out of contact with them.

2. A spring wheel having a hub member having two sets of pivots spaced apart in circles of different radii, a rim member having a plurality of inwardly projecting lugs, each of which carries two pivots, a plurality of groups of curved springs connecting said hub and rim member, each of said groups comprising two pairs of springs of unequal length, one spring of each pair being connected to the same pivot on the rim member but to separate pivots on the hub member, the shorter pair of springs being located between the members of the longer pair and out of contact therewith except at the rim pivot.

In testimony whereof I affix my signature.

CICERO G. SMITH.